US010285479B1

United States Patent
Bradberry et al.

(10) Patent No.: US 10,285,479 B1
(45) Date of Patent: May 14, 2019

(54) CORD POUCH ORGANIZER

(71) Applicants: Patricia Faith Bradberry, Suwanee, GA (US); Joseph Pete Bradberry, Suwanee, GA (US)

(72) Inventors: Patricia Faith Bradberry, Suwanee, GA (US); Joseph Pete Bradberry, Suwanee, GA (US)

(73) Assignee: PFB Innovations, LLC, Suwanee, GA (US)

( * ) Notice: Subject to any disclaimer, the term of this patent is extended or adjusted under 35 U.S.C. 154(b) by 0 days.

(21) Appl. No.: 15/896,210

(22) Filed: Feb. 14, 2018

Related U.S. Application Data

(60) Provisional application No. 62/459,739, filed on Feb. 16, 2017.

(51) Int. Cl.
*A45C 13/02* (2006.01)
*G06F 1/16* (2006.01)
*A45C 1/02* (2006.01)
*H02G 11/02* (2006.01)

(52) U.S. Cl.
CPC ............... *A45C 13/02* (2013.01); *A45C 1/02* (2013.01); *G06F 1/1628* (2013.01); *H02G 11/02* (2013.01); *A45C 2013/025* (2013.01)

(58) Field of Classification Search
CPC .............. A45C 13/02; A45C 2011/001; A45C 2011/002; A45C 5/03
USPC ............ 150/106; 242/472.8; 206/459.5, 320
See application file for complete search history.

(56) References Cited

U.S. PATENT DOCUMENTS

| 2,467,662 | A   | * | 4/1949  | Freiberg  | A45C 13/02 150/117 |
| 7,624,777 | B2  | * | 12/2009 | Paller    | A45C 3/00 150/112  |
| 2004/0085694 | A1 | * | 5/2004 | Germagian | A45C 13/02 361/90  |
| 2006/0243766 | A1 | * | 11/2006 | Lan      | A45C 11/00 224/275 |
| 2006/0251283 | A1 | * | 11/2006 | Yeh      | H04R 1/1033 381/388 |
| 2009/0175482 | A1 | * | 7/2009 | Crutcher  | A42B 1/245 381/376 |
| 2011/0203954 | A1 | * | 8/2011 | Kroupa    | B65H 75/4431 206/320 |
| 2012/0262117 | A1 | * | 10/2012 | Ferber   | H02J 7/0047 320/111 |
| 2015/0101958 | A1 | * | 4/2015 | Cross     | A45C 5/14 206/702  |
| 2015/0365756 | A1 | * | 12/2015 | Merenda  | H04R 1/1033 381/375 |
| 2016/0058144 | A1 | * | 3/2016 | Tebo      | B65H 75/406 206/38 |
| 2017/0360166 | A1 | * | 12/2017 | Felks    | A45C 11/00         |

* cited by examiner

*Primary Examiner* — Sue A Weaver
(74) *Attorney, Agent, or Firm* — Luedeka Neely Group, PC

(57) ABSTRACT

A cord pouch organizer includes a pouch or other enclosure with a zipper or other closure on one end; a slit or other aperture in each end from which cords could be pulled through; two areas on which to write or provide labels to identify device type and owner's name/initials or other identifying indicium or indicia.

5 Claims, 6 Drawing Sheets

CORD POUCH ORGANIZER

CROSS REFERENCE TO RELATED APPLICATION

This application claims priority to U.S. Provisional Application No. 62/459,739 filed Feb. 16, 2017, entitled CORD POUCH ORGANIZER, incorporated by reference herein in its entirety.

FIELD

This disclosure relates to the field of mobile phone and portable computing device accessories. More particularly, this disclosure relates to a portable pouch configured to organize, uniquely identify, and protect charging cables and adapters for a variety of mobile phone and computing devices.

BACKGROUND

Improvement is desired in regards to storing charging cables and adapters associated with mobile phones and computing devices. Today, people have a variety of personal computing devices, including mobile phones, music listening devices, tablets, and pads. These may each require a separate charging cable and wall plate charging adapter. Typically, these cables and the like are stuffed in drawers and become tangled and difficult to determine which cable is for which device.

Accordingly, there is a need to better organize charging cables and wall plate charging adapters for small electronic devices such as smart phones and tablets while the device is being charged, as well as when not in use. Benefits include a reduction of clutter on counter tops, in drawers, and in travel bags; a reduction in the number of lost charging cables and adapters; and reduced confusion when trying to locate the appropriate charging cable.

In addition, there is a need to personalize storage for the charging cables and adapters. This need can be heightened by the number and types of devices supported as well as the number of individuals living and working in close proximity. This would also serve to reduce confusion over ownership; reduce the incidence of lost or misplaced charging cables and adapters; and reduced confusion when trying to locate the appropriate charging cable for a device.

There is also a need to improve the aesthetics of unsightly tangled or untidy charging cables, regardless of the number of devices owned.

SUMMARY

The above and other needs are met by a cord pouch organizer according to the disclosure.

In one aspect, a cord pouch organizer includes a closeable enclosure configured for receiving a personal electronic device and electrical cords associated with the electronic device.

The enclosure includes one or more apertures located on the enclosure for enabling passage of the electrical cords from an interior of the enclosure to an exterior of the enclosure, and one or more label areas located on the exterior of the enclosure for providing customized indicia or indicium corresponding to personal information of the user of the pouch organizer and/or information about the electronic device with which organizer.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
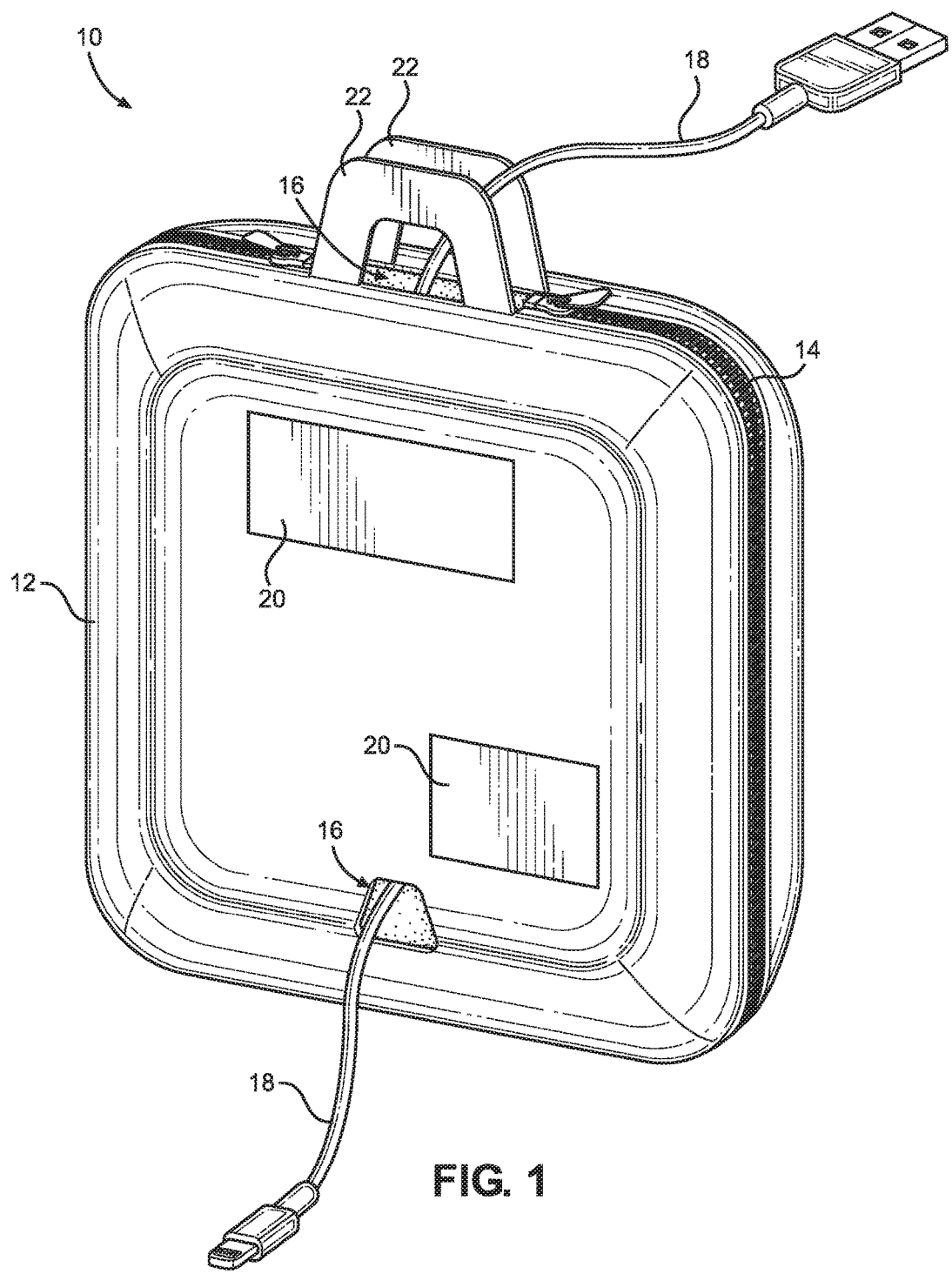
FIG. 1 is a perspective view of a cord pouch organizer according to the disclosure in a closed configuration.
Figure 2:
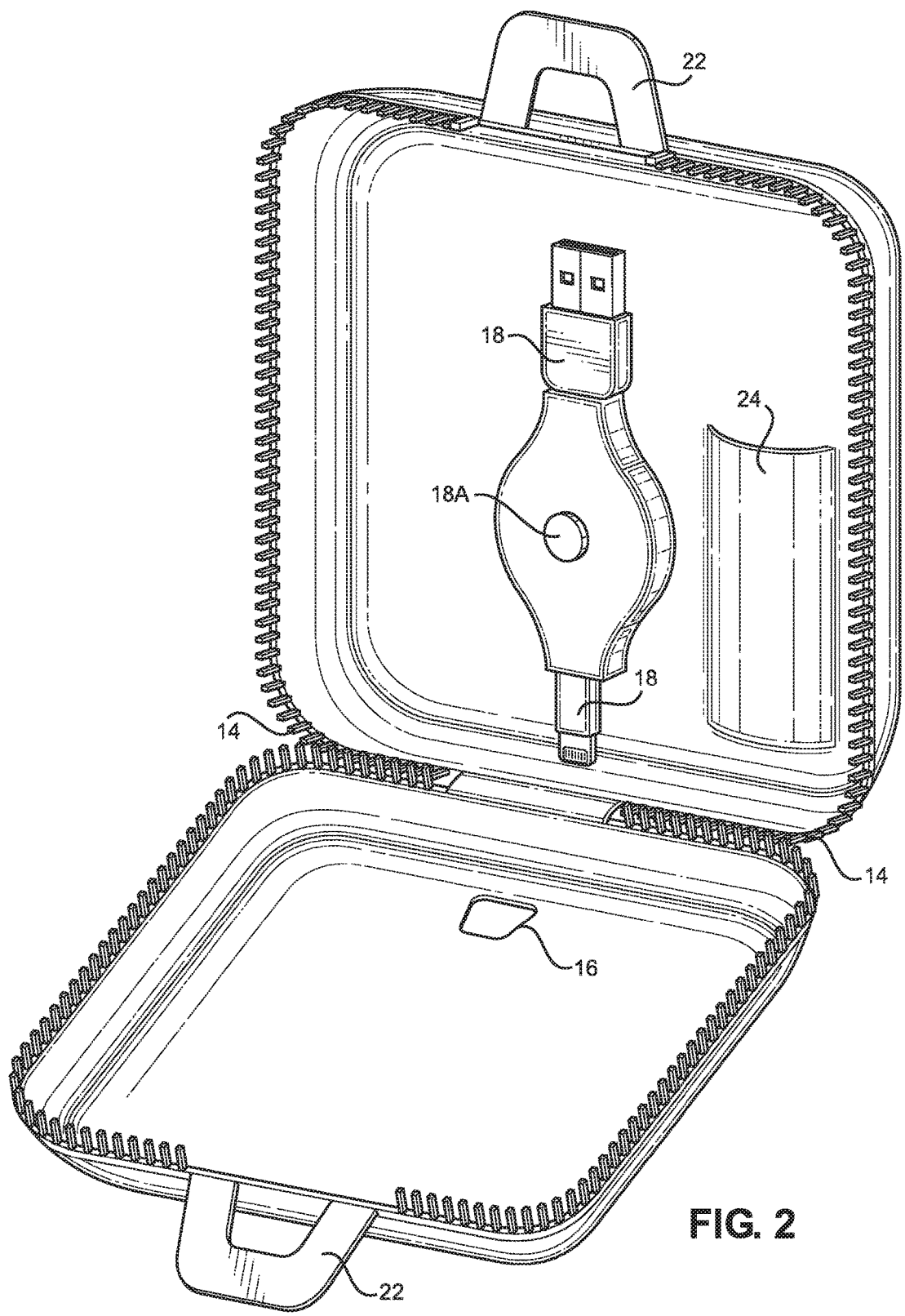
FIG. 2 is a perspective view of the cord pouch organizer of FIG. 1 in an open configuration.
Figure 3:
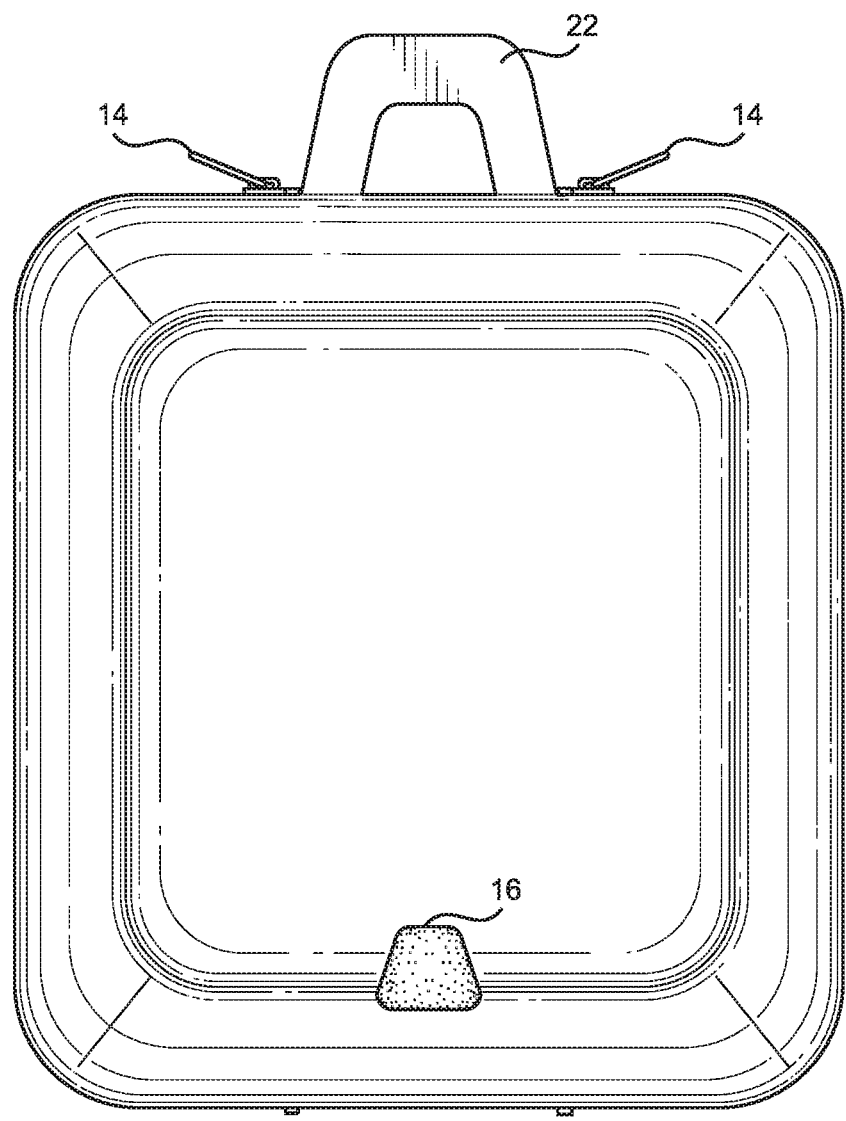
FIG. 3 is a front view of FIG. 1.
Figure 4:
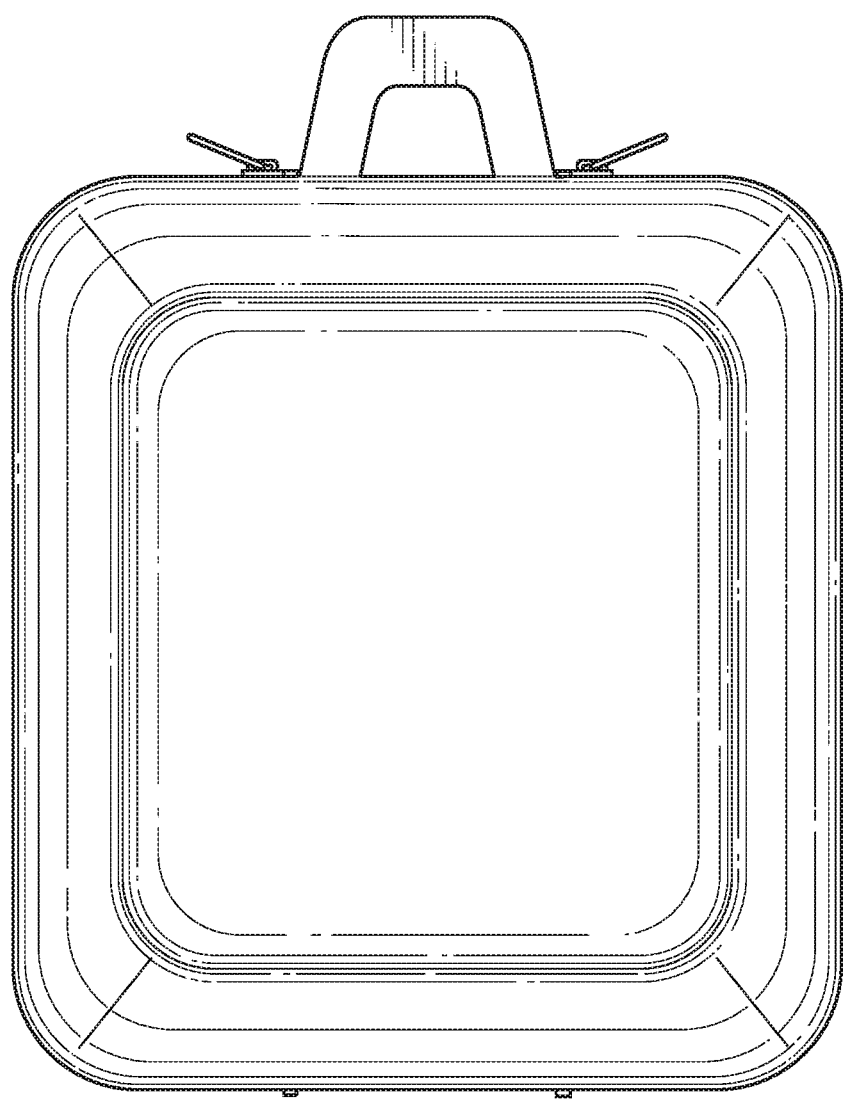
FIG. 4. is a rear view of FIG. 1.
Figure 5:
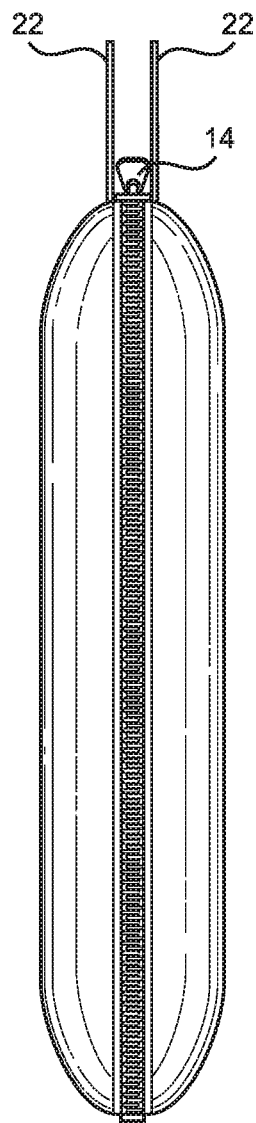
FIG. 5 is a right-side view of FIG. 1.
Figure 6:
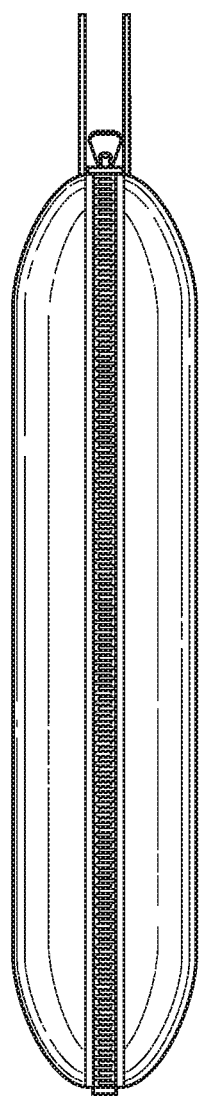
FIG. 6 is a left-side view of FIG. 1.
Figure 7:
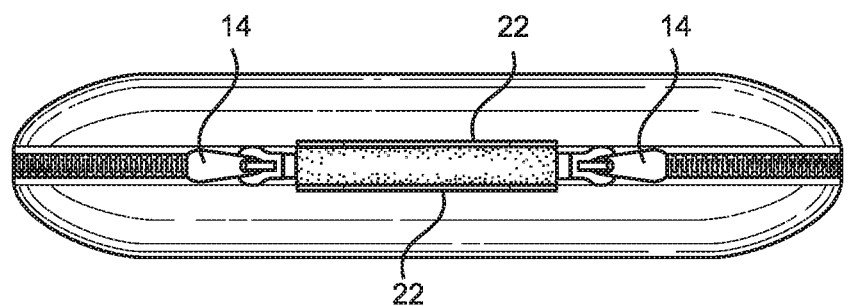
FIG. 7 is a top view of FIG. 1.
Figure 8:
FIG. 8 is a bottom view of FIG. 1.

With reference to the drawings, there are shown a cord pouch organizer 10 according to the disclosure. The cord pouch organizer 10 advantageously provides a designated and personalized organizer for storing and identifying device charging cables and wall plate charging adapters when charging a device, as well as when not in use.

The cord pouch organizer 10 includes a pouch 12 having an adjustable closure such as a zipper 14. The organizer 10 also includes a plurality of apertures 16 through which electrical cords 18 may pass. The organizer 10 also preferably includes handles 22 to facilitate carrying of the organizer and/or hanging of the organizer 10. A battery holder 24 is preferably located on the interior of the pouch 12 for holding a battery or other portable power supply.

The cord pouch organizer 10 advantageously serves to keep charging cables and adapters organized and separate from other charging cables, charging adapters or miscellaneous items. The cord pouch organizer 10 also enables easy identification of which device(s) each charging cable supports. The cord pouch organizer 10 also facilitates maintenance of ownership of the charging cable and adapter, and serves to protect the charging cable and adapter.

The pouch 12 is configured for storing one or more personal electronic devices, such as phones, pads, and the like. The pouch 12 is desirably openable in a clamshell manner as shown for ease of access. The pouch 12 is desirably made of an attractive and durable fabric, neoprene or polymeric material. The material is preferably water resistant or treated to be water resistant.

The closure 14 is shown as a zipper. This is preferred. However, other closures, such as snaps, buckles, buttons and the like may be used.

Preferably at least two of the apertures 16 are provided. In this regard, one of the apertures 16, such as the one adjacent the handles 22, may be provided by operation of the zipper 14 to leave a gap sized to serve as an aperture for one of the cords 18.

The cords 18 represent charging cables, charging adapters, headphone cords, and the like for personal electronic devices. The cords 18 may be provided in conjunction with a cord reel 18a, preferably affixed to the interior of the pouch 12. The cords 18 cooperate with the apertures 16 to enable interfacing with a source of power, such as an electrical outlet, and enabling the device to be exterior of the pouch while connected to power. Alternatively, headphone cords and the like may be passed through the apertures 16.

The label areas 20 enable a user to personalize the cord pouch organizer 10. The label areas 20 may be provided as by a writable surface to provide ample space to record a note on the device type as well as an owner name. The writable surface may be marked with permanent or semi-permanent markers and cleaned or erased with a cleaning wipe. Alternatively, the labels areas 20 may be clear sleeves into which a card with personal information may be displayed.

The battery holder 24 is configured to receive a portable battery charger for those times when an A/C outlet is not available The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A cord pouch organizer, comprising a closeable enclosure configured for receiving a personal electronic device and electrical cords associated with the electronic device; the enclosure including one or more apertures located on the enclosure for enabling passage of the electrical cords from an interior of the enclosure to an exterior of the enclosure, and one or more label areas located on the exterior of the enclosure for providing customized indicia or indicium corresponding to personal information of the user of the pouch organizer and/or information about the electronic device with which organizer is used.

2. The organizer of claim 1, wherein the enclosure includes a zipper about a perimeter of the enclosure.

3. The organizer of claim 1, wherein the electrical cords comprise a cord reel affixed to an interior of the enclosure.

4. The organizer of claim 1, wherein the enclosure comprises a clamshell enclosure.

5. A cord pouch organizer, consisting essentially of a closeable enclosure configured for receiving a personal electronic device and electrical cords associated with the electronic device; the enclosure including at least one aperture defined on the enclosure and configured for enabling passage of the electrical cords from an interior of the enclosure to an exterior of the enclosure, and one or more designated label areas located on the exterior of the enclosure for providing customized indicia or indicium corresponding to personal information of the user of the pouch organizer and/or information about the electronic device with which organizer is used.

* * * * *